G. PARKER.
Self-Lubricating Stop-Cocks.

No. 131,065.  Patented Sep. 3, 1872.

Witnesses:
A. W. Almqvist
W. A. Graham

Inventor:
G. Parker
per ——— Attorneys

UNITED STATES PATENT OFFICE.

GEORGE PARKER, OF BOSTON HIGHLANDS, MASSACHUSETTS.

IMPROVEMENT IN SELF-LUBRICATING STOP-COCKS.

Specification forming part of Letters Patent No. 131,065, dated September 3, 1872.

Specification describing a new and useful Improvement in Self-Oiling Faucets, invented by GEORGE PARKER, of Boston Highlands, in the county of Suffolk and State of Massachusetts.

Faucets and stop-cocks as usually constructed soon become loose from use and require to be screwed up so tightly that the friction renders them nearly inoperative. When they are first put in use the lubricating-oil of the manufacturer remains for some time and the plug works well in the shell. When that wears out the annoyance commences. The plug must be taken out and oiled frequently, or it leaks or sticks when screwed up.

My object is to provide a remedy for this and to render the faucet self-oiling, so that it will work easy and uniformly at all times without wear or undue friction.

Figure 1:
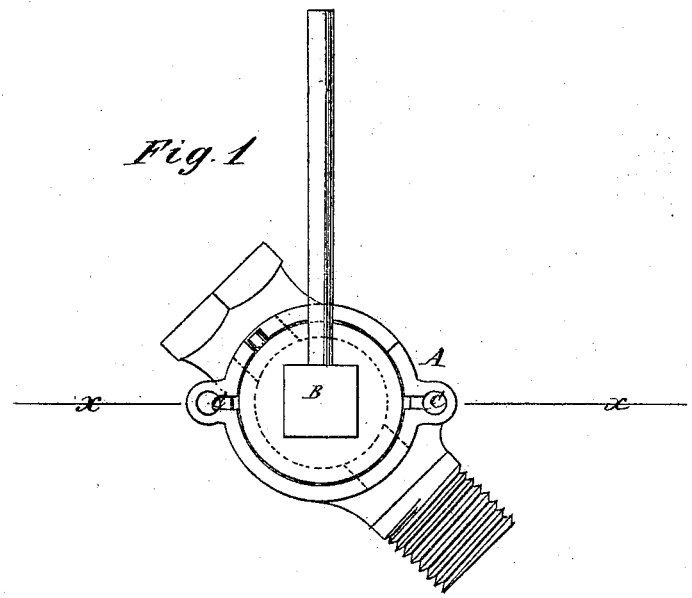
Figure 2:
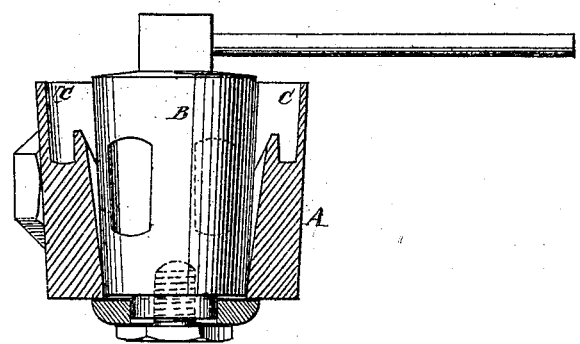

In the accompanying drawing, Figure 1 represents a top view of the faucet, showing the oil-grooves. Fig. 2 is a transverse section of Fig. 1 taken on the line $x\,x$.

Similar letters of reference indicate corresponding parts.

A is the shell, which may be in any form to allow of the use of a plug with one or more discharge-orifices, as for a two, three, or four way cock. B is the plug, which is fitted and ground to the shell in usual manner. C represents a groove (one or more) shown in the shell in this example of my invention, but it may be in the plug. The groove or grooves commence with a hole slotted out to the joint and then tapering down to near the bottom, as seen in Fig. 2.

Having thus described my invention, I claim as new and desire to secure by Letters Patent—

The plug B, combined with a shell, A, having conical cavity large enough to allow a space between them, and having the oil-chamber C arranged at upper part, as described, for the purpose of forming an improved faucet.

GEORGE PARKER.

Witnesses:
    GILES H. RICH,
    WARREN PARKER.